United States Patent [19]

Iorfida

[11] Patent Number: 5,546,687
[45] Date of Patent: *Aug. 20, 1996

[54] APPARATUS FOR DISPLAYING AN ILLUMINATED IMAGE INCLUDING LIGHT INTENSIFIER AND METHOD THEREFOR

[76] Inventor: Paul Iorfida, 13 Orchard Ave., #4, Cincinnati, Ohio 45215

[ * ] Notice: The term of this patent shall not extend beyond the expiration date of Pat. No. 5,371,656.

[21] Appl. No.: 394,730

[22] Filed: Feb. 27, 1995

[51] Int. Cl.⁶ .................................................. F21V 8/00
[52] U.S. Cl. ................... 40/546; 40/714; 362/31; 362/128
[58] Field of Search .............. 40/543, 546; 362/31, 362/128, 135, 145, 32

[56] References Cited

U.S. PATENT DOCUMENTS

| | | | |
|---|---|---|---|
| 4,059,916 | 11/1977 | Tachilara et al. | 40/152.2 X |
| 5,032,711 | 7/1991 | Yamada | 40/543 X |
| 5,211,464 | 5/1994 | Bohmer | 361/31 |
| 5,262,928 | 11/1993 | Kashima et al. | 361/31 |
| 5,371,656 | 12/1994 | Iorfida | 40/152.2 X |

*Primary Examiner*—Brian K. Green
*Assistant Examiner*—Cassandra Davis
*Attorney, Agent, or Firm*—Harry M. Weiss; Jeffrey D. Moy; Harry M. Weiss & Associates, P.C.

[57] ABSTRACT

A transparent acrylic sheet carries a mirrored coating on its back surface. The sheet has a ground front surface that has a layer of fluorescent paint, or, alternatively, a translucent layer of diluted fluorescent paint applied thereto. The fluorescent paint layer carries a cibachrome image transparency. Light passes through an edge of the sheet to the ground surface where it is diffused and amplified by the excitation of the fluorescent particles in the fluorescent paint. The amplified, diffused light illuminates a back surface of the transparency, thereby providing a display of an illuminated image to an observer who views a front surface of the transparency.

16 Claims, 1 Drawing Sheet

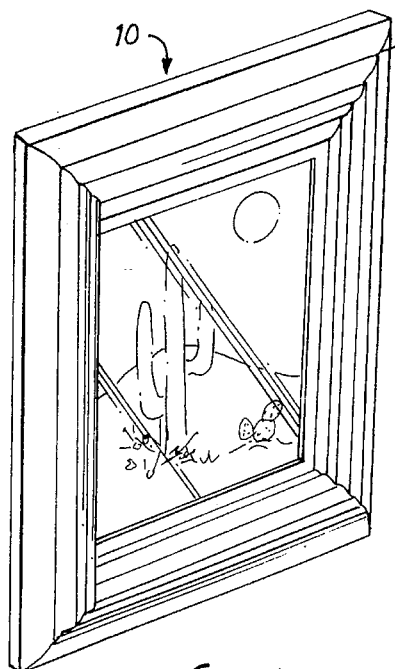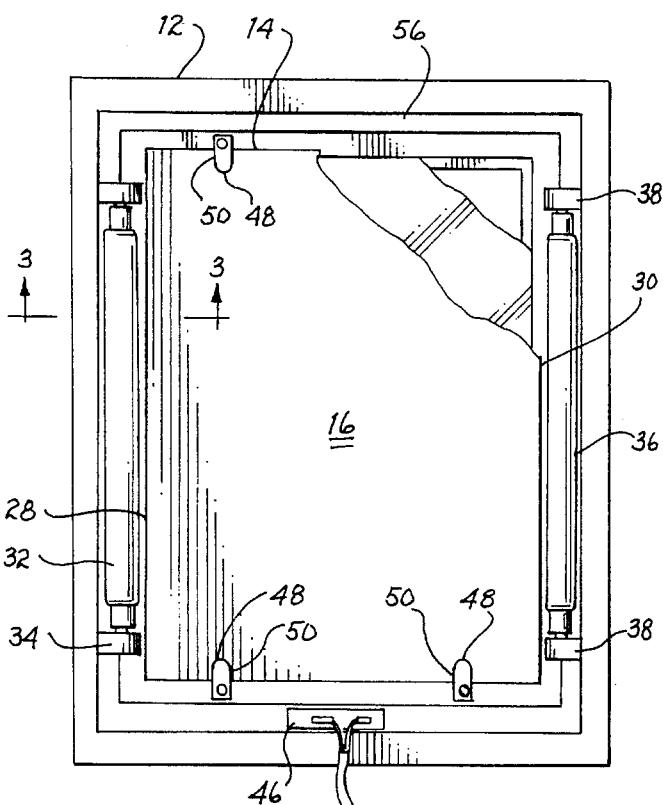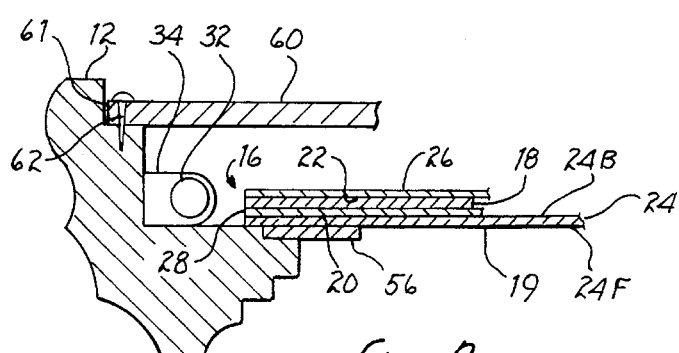

APPARATUS FOR DISPLAYING AN ILLUMINATED IMAGE INCLUDING LIGHT INTENSIFIER AND METHOD THEREFOR

RELATED APPLICATION

This patent application is related to issued U.S. Pat. No. 5,371,656 entitled "APPARATUS FOR DISPLAYING AN ILLUMINATED IMAGE AND METHOD THEREFOR," in the name of the same inventor, and is incorporated herein by reference.

BACKGROUND OF THE INVENTION

1. Field of the Invention

This invention is in the field of pictorial displays and methods therefor and, more particularly, is an apparatus and a method for displaying an illuminated image.

2. Description of the Related Art

A display of an illuminated image is often desirable because illumination makes features of the image discernable when there is little ambient light. Additionally, the illumination attracts the attention of those in its vicinity.

When the image is carried in a medium such as an image transparency, the back of the transparency is usually illuminated to cause the illuminated image to appear to an observer located in front of the transparency. One way of illuminating the transparency includes providing a light box from which one or more fluorescent bulbs transmit light through a translucent material to the back of the transparency.

Another way of illuminating the transparency includes the use of a plurality of incandescent bulbs and mirrors at the back of the transparency. Alternatively, light from an incandescent bulb is transmitted directly to the front of the transparency.

Although apparatus for providing the above-described illumination is suitable for displaying an illuminated image of a size used for a wall hanging, they are too large for displaying an illuminated image of a reduced size that is suitable for placement on a desk, for example.

The apparatus disclosed in related U.S. Pat. No. 5,371,656 displays an illuminated image. One of the advantages offered in the related display apparatus is the use of a frosted or ground surface area. A ground surface area provides an effective increase in total surface area over that provided by a smooth surface, and, therefore, the ground surface area provides more light to illuminate an image coupled thereto. One of the primary goals in this art is to provide as much light as possible to the back of a transparency such that it may be more easily seen. To that end, an advance over the related display apparatus includes the use of a light intensifier coupled to the ground surface. The light intensifier comprises a translucent layer of diluted fluorescent paint applied to the ground surface. As fluorescent light passes through the fluorescent paint layer, the fluorescent particles therein become excited, thereby increasing the intensity of the light passing through the transparency.

There is no current display apparatus that combines the advantages of the related display apparatus with the advantages provided by the use of the light intensifier, therefore, there existed a need to provide such an improved apparatus and a method therefor.

SUMMARY OF THE INVENTION

An object of the present invention is a transmission of amplified, diffused light to an image transparency and method therefor.

Another object of the present invention is a transmission of amplified, diffused light to an image transparency of reduced size and a method therefor.

BRIEF DESCRIPTION OF THE PREFERRED EMBODIMENTS

According to the present invention, a sheet of an optical material has a mirrored back surface and a ground front surface. A layer of fluorescent paint, or, alternatively, a translucent layer of diluted fluorescent paint is applied to the ground front surface. In a preferred embodiment, the fluorescent paint is the STROBLITE, UV Blacklight Tempera Paint (Invisible Blue). It is important that the fluorescent paint is applied to the ground front surface in a thin see-through, milky layer, so as not to cover over or fill in the depressions of the ground surface. After the fluorescent paint layer or light intensifier means is applied to the ground surface, the ground front surface of the sheet is bonded to the back surface of an image transparency. Light transmitted through an edge of the sheet is diffused by the ground surface, and amplified or intensified by the excitation of the fluorescent particles in the fluorescent paint layer. The amplified, diffused light is transmitted to the back surface of the transparency to provide an illuminated image to an observer located in front of the transparency.

The present invention provides an apparatus for displaying an illuminated image of a size suitable for a wall hanging or of a size suitable for placement on a desk, however, larger size illuminated images may be accommodated as well.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 is a perspective view of an image transparency within a frame;

FIG. 2 is a rear view, with parts broken away, of the frame of FIG. 1 and its contents; and FIG. 3 is a partial section of FIG. 2 taken along the line 3–3.

DESCRIPTION OF THE PREFERRED EMBODIMENTS

As shown in FIGS. 1–3, a display 10 includes a frame 12 having a recess 14 (FIG. 2) wherein a laminate 16 is maintained as explained hereinafter.

Laminate 16 is comprised of a transparent acrylic sheet 18 that has a ground front surface 20, a polished back surface 22 and polished side edges 28, 30. A layer of fluorescent paint 19, or, alternatively, a translucent layer of diluted fluorescent paint 19 is applied to the ground front surface 20. Surfaces 19, 22 carry an image transparency 24 and a mirrored coating 26, respectively. Transparency 24 is of a type that is marketed under the trade designations of CIBACHROME and DURATANS, which are the respective Trademarks of Ciba-Geigy, Limited and Eastman Kodak Company for transpariencies and film. Transparency 24 may also be an electrostatic transparency, thermal imaging transparency, or a digital output inkjet transparency. Although sheet 18 may alternatively be made from glass, acrylic has light transmission characteristics that are superior to those of most types of glass.

To form laminate 16, a back surface 24B of transparency 24 is bonded to surface 20 by any one of a plethora of well known transparent photographic adhesives. Additionally, a front surface 24F of transparency 24 is coated with a transparent photographic laminate coating to protect transparency 24 against dust. Photographic laminate coatings are well known to those skilled in the art.

Adjacent to edge 28 is a cylindrical fluorescent lamp 32 that has respective ends removably mounted within fixtures 34. Fixtures 34 are connected to frame 12 at respective locations that are selected to cause the axis of lamp 32 to be substantially parallel to edge 28. Because edge 28 is adjacent to lamp 32, emitted light therefrom passes through edge 28 into sheet 18.

Similarly, adjacent to edge 30 is a cylindrical fluorescent lamp 36 that has respective ends removably mounted within fixtures 38. Fixtures 38 are connected to frame 12 at respective locations that are selected to cause the axis of lamp 36 to be substantially parallel to edge 30. Because edge 30 is adjacent to lamp 36, emitted light therefrom passes through edge 30 into sheet 18.

The light in sheet 18 is either directly transmitted to surface 19 or reflected from coating 26 to surface 19. Because surface 20 is ground, diffused light is emitted therefrom, and light passing through surface or layer 19 is amplified due to the excitation of the fluorescent particles in the fluorescent paint. The amplified, diffused light illuminates surface 24B, thereby providing the display of the illuminated image to an observer who views surface 24F.

Lamps 32, 36 receive electrical power via a connection of wires 40 (FIG. 2) to an electrical outlet (not shown). Wires 40 are connected through a switch 42 and wires 44 to a transformer 46. Switch 42 is operable to cause the electrical power to be provided to transformer 46. Wires from transformer 46 are connected through wires (not shown) to fixtures 34, 38. Wiring of fluorescent lamps is well known to those skilled in the illumination art.

Laminate 16 is maintained within recess 14 by a plurality of spring clips 48 that are fastened by screws 50 to frame 12. Clips 48 bear against coating 26 to cause laminate 16 to abut a matting 56 which is described hereinafter.

A front surface 24F of laminate 16 is bordered by matting 56. Frame 12 has a notch wherein a portion of matting 56 is retained. The use of a matting with a framed display is well known to those skilled in the photographic art.

Recess 14 is covered by a back panel 60 (FIG. 3) that has edges that fit within a notch 61 that extends along the perimeter of recess 14. Panel 60 is fastened to frame 12 by a plurality of screws 62. Panel 60 prevents light from lamps 32, 36 from passing outside of recess 14 through the back of frame 12.

Although the invention has been particularly shown and described with reference to a preferred embodiment thereof, it will be understood by those skilled in the art that changes in form and detail may be made therein without departing from the spirit and scope of the invention.

What is claimed is:

1. Apparatus for displaying an illuminated image in a frame, comprising, in combination:

a transparent optical material that has a polished back surface, polished edges and a ground front surface;

a mirrored coating that is carried on and in contact with said polished back surface of said transparent optical material;

light intensifier means coupled to said ground front surface for increasing intensity of light passing therethrough;

an image transparency that has a back surface bonded to said light intensifier means; and means for passing light through said edges for reflection from said mirrored coating through said ground surface, said light intensifier means, and said image transparency in contact therewith to provide a lit display of said image transparency.

2. The apparatus of claim 1 wherein said optical material is a sheet of acrylic.

3. The apparatus of claim 1 additionally comprising a photographic laminate coating that covers a front surface of said image transparency.

4. The apparatus of claim 1 wherein said means for passing light comprises a light source adjacent one of said edges.

5. The apparatus of claim 4 wherein said light source is a fluorescent lamp connected to said frame.

6. The apparatus of claim 5 wherein said lamp is of a generally cylindrical shape with the axis of said lamp parallel to said one of said edges.

7. The apparatus of claim 1 wherein said image transparency is selected from the group consisting of at least one of electrostatic transparencies, thermal imaging transparencies, digital and output inkjet transparencies.

8. The apparatus of claim 1 wherein said light intensifier means comprises a translucent layer of diluted, fluorescent paint.

9. A method for displaying an illuminated image in a frame comprising the steps of:

providing a transparent optical material that has a polished back surface, polished edges and a ground front surface;

providing a mirrored coating that is carried on and in contact with said polished back surface of said transparent optical material;

providing light intensifier means coupled to said ground front surface for increasing intensity of light passing therethrough;

providing an image transparency that has a back surface bonded to said light intensifier means; and providing means for passing light through said edges for reflection from said mirrored coating through said ground surface, said light intensifier means, and said image transparency in contact therewith to provide a lit display of said image transparency.

10. The method of claim 9 wherein said optical material is a sheet of acrylic.

11. The method of claim 9 additionally comprising the step of providing a photographic laminate coating that covers the front surface of said image transparency.

12. The method of claim 11 wherein the step of providing said means for passing light comprises the step of providing a light source adjacent one of said edges.

13. The method of claim 12 wherein said light source is a fluorescent lamp connected to said frame.

14. The method of claim 13 wherein said lamp is of a generally cylindrical shape with the axis of said lamp parallel to said one of said edges.

15. The method of claim 9 wherein the step of providing said light intensifier means comprises the step of providing a layer of fluorescent paint.

16. The method of claim 9 wherein the step of providing said light intensifier means comprises the step of providing a translucent layer of diluted, fluorescent paint.

* * * * *